United States Patent
Lee et al.

(10) Patent No.: US 10,914,275 B2
(45) Date of Patent: Feb. 9, 2021

(54) FILTER COVER STRUCTURE OF DRAWER-TYPE AIR CLEANER FOR VEHICLES, AIR CLEANER, INTAKE SYSTEM, AND VEHICLE INCLUDING THE SAME

(71) Applicants: Hyundai Motor Company, Seoul (KR); Kia Motors Corporation, Seoul (KR)

(72) Inventors: Seung-Hyun Lee, Incheon (KR); Hae-Jun Jeong, Gyeonggi-do (KR); Yoon-Geun Cho, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 183 days.

(21) Appl. No.: 16/194,929

(22) Filed: Nov. 19, 2018

(65) Prior Publication Data

US 2019/0376477 A1    Dec. 12, 2019

(30) Foreign Application Priority Data

Jun. 8, 2018  (KR) .................. 10-2018-0066060

(51) Int. Cl.
*F02M 35/02*     (2006.01)
*F02M 35/024*    (2006.01)
*B01D 46/00*     (2006.01)
*B60H 3/06*      (2006.01)

(52) U.S. Cl.
CPC ..... *F02M 35/0203* (2013.01); *B01D 46/0004* (2013.01); *B01D 46/0006* (2013.01); *B60H 3/0616* (2013.01); *F02M 35/02416* (2013.01); *B01D 2201/305* (2013.01)

(58) Field of Classification Search
CPC ............ B01D 46/0006; B01D 46/0004; B01D 2203/305; B60H 3/0616; F02M 35/0203; F02M 35/02416; F02M 35/0201
USPC ..... 55/385.3, 357, 381, 480, 502; 123/198 E
See application file for complete search history.

(56) References Cited

U.S. PATENT DOCUMENTS

| | | | | |
|---|---|---|---|---|
| 6,217,627 | B1 * | 4/2001 | Vyskocil | B01D 46/0005 123/198 E |
| 10,259,293 | B2 * | 4/2019 | Schumacher | B01D 46/0006 |
| 2008/0110146 | A1 * | 5/2008 | Germain | B60H 3/0616 55/385.3 |
| 2012/0073252 | A1 * | 3/2012 | Lee | F02M 35/0203 55/385.3 |
| 2013/0139483 | A1 * | 6/2013 | Jung | F02M 35/0209 55/480 |

(Continued)

FOREIGN PATENT DOCUMENTS

JP      05-032809 U    4/1993
JP      2556724 Y2    12/1997

(Continued)

*Primary Examiner* — Minh Chau T Pham
(74) *Attorney, Agent, or Firm* — Mintz Levin Cohn Ferris Glovsky and Popeo, P.C.; Peter F. Corless

(57) ABSTRACT

A filter cover structure of a drawer-type air cleaner is provided. The structure includes a main body in which an air filter reception part is formed and a filter cover provided to open or close the air filter reception part. The filter cover includes a lever configured to be locked to or released from a filter cover fastening part of the air filter reception part by rotating the lever around a rotating shaft.

18 Claims, 11 Drawing Sheets

(56) References Cited

U.S. PATENT DOCUMENTS

| | | | |
|---|---|---|---|
| 2015/0007530 A1* | 1/2015 | Cho | F02M 35/02491 55/357 |
| 2015/0040527 A1* | 2/2015 | Cho | F02M 35/0203 55/481 |
| 2015/0052859 A1* | 2/2015 | Cho | F02M 35/1222 55/357 |

FOREIGN PATENT DOCUMENTS

| | | |
|---|---|---|
| JP | 2001-173531 A | 6/2001 |
| KR | 100911997 B1 | 8/2009 |
| KR | 2012-0004507 U | 6/2012 |
| KR | 2013-0061599 A | 6/2013 |
| KR | 101526707 B1 | 6/2015 |
| KR | 101619895 B1 | 5/2016 |

\* cited by examiner

FILTER COVER STRUCTURE OF DRAWER-TYPE AIR CLEANER FOR VEHICLES, AIR CLEANER, INTAKE SYSTEM, AND VEHICLE INCLUDING THE SAME

CROSS-REFERENCE(S) TO RELATED APPLICATIONS

This application claims priority to Korean Patent Application No(s). 10-2018-0066060, filed on Jun. 8, 2018, which is incorporated herein by reference in its entirety.

BACKGROUND

Field of the Invention

The present invention relates to a filter cover structure of a drawer-type air cleaner for vehicles, an air cleaner, an intake system, and a vehicle including the same; and, more particularly, to a filter cover structure of a drawer-type air cleaner for vehicles that improves the force required when opening and closing a filter cover to replace an air cleaner for a vehicle, and that enhances convenience of use and the appearance, an air cleaner, an intake system, and a vehicle including the same.

Description of Related Art

Generally, an engine room for a vehicle includes an intake system through which fresh air is supplied to an engine. The intake system includes an air cleaner which filters out foreign substances from outside air introduced into the intake system and thus generates fresh air. Since intake air includes dust or fine impurities contained in the atmosphere, the dust or impurities should be removed from the intake air before the intake air is supplied into a cylinder of the engine.

In the air cleaner of the conventional intake system, when an air filter is replaced with a new one, a cover is fastened using a clamp fastening structure. The clamp fastening structure is classified into a non-exposure type and an exposure type. In the clamp exposure type, the aesthetic appearance deteriorates since the fastening structure is exposed to the outside, and there are disadvantages in that there is a need of securing space for a clamp operation trajectory, and the force required for operation excessively increases. Additionally, the clamp non-exposure type is disadvantageous in that the force required for operation may excessively increase due to product quality deviation. Although there is also a stopper fastening structure, there is a disadvantage in that the aesthetic appearance deteriorates due to external exposure of the fastening structure.
Japanese Laid-Open Patent Publications No. 2001-173531

SUMMARY

The present invention is directed to a filter cover structure of a drawer-type air cleaner for vehicles capable of enhancing convenience in replacement of a filter of an air cleaner and improving the force required for opening and closing a filter cover, and an air cleaner, an intake system, and a vehicle including the same. Other objects and advantages of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with an exemplary embodiment of the present invention, a filter cover structure of a drawer-type air cleaner may include: a main body in which an air filter reception part is formed; and a filter cover provided to open or close the air filter reception part. The filter cover may include a lever configured to be locked to or released from a filter cover fastening part of the air filter reception part by rotating the lever around a rotating shaft.

The lever may include: a handle; the rotating shaft configured to rotate when force is applied to the handle; and a locking part that extends toward a cover body of the filter cover. A support part of the rotating shaft may be rounded. An end of the locking part may have a hook shape. The lever may have, in an inner surface thereof, an elastic member fixing depression to which the elastic member may be fixed. The filter cover may include, in a front portion thereof, a recessed part coupled with the lever.

The recessed part may include: a top surface; side surfaces that extend from the top surface in opposite directions; and a rear surface that extends rearward from the top surface. Each of the side surfaces may have a triangular shape. A partition plate that prevents deformation may be provided in the filter cover. The partition plate may be disposed on a rear portion of the recessed part coupled with the lever.

A lever position adjustment part for adjusting a position of the lever may be provided in the filter cover. An elastic member fixing part may be provided in the filter cover to fix the elastic member to the elastic member fixing part. A cover body mounting part may be provided on a rear portion of the filter cover and rotatably coupled to the main body. The filter cover may include: a cover body; the lever coupled to a front portion of the cover body based on a direction in which the lever is coupled to the cover body; and an elastic member configured to apply elasticity to the lever. The filter cover fastening part may be provided in the main body to lock the locking part of the lever to the filter cover fastening part. An outer surface of the filter cover fastening part may be rounded.

In accordance with another exemplary embodiment of the present invention, a drawer-type air cleaner for vehicles may include the filter cover structure of the drawer-type air cleaner. In accordance with yet another exemplary embodiment of the present invention, an intake system configured to supply fresh air passing through an air cleaner may include the filter cover structure into an engine.

In accordance with yet another exemplary embodiment of the present invention, a vehicle may include the intake system mounted with the air cleaner, the intake system being mounted to an engine room provided with an engine. In a filter cover structure of a drawer-type air cleaner, an air cleaner, an intake system, and a vehicle including them in accordance with the present invention, convenience in replacement of an air cleaner filter may be enhanced, the aesthetic appearance may be improved, and the force required for opening or closing a filter cover may be optimized, whereby the quality of the product may be improved.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
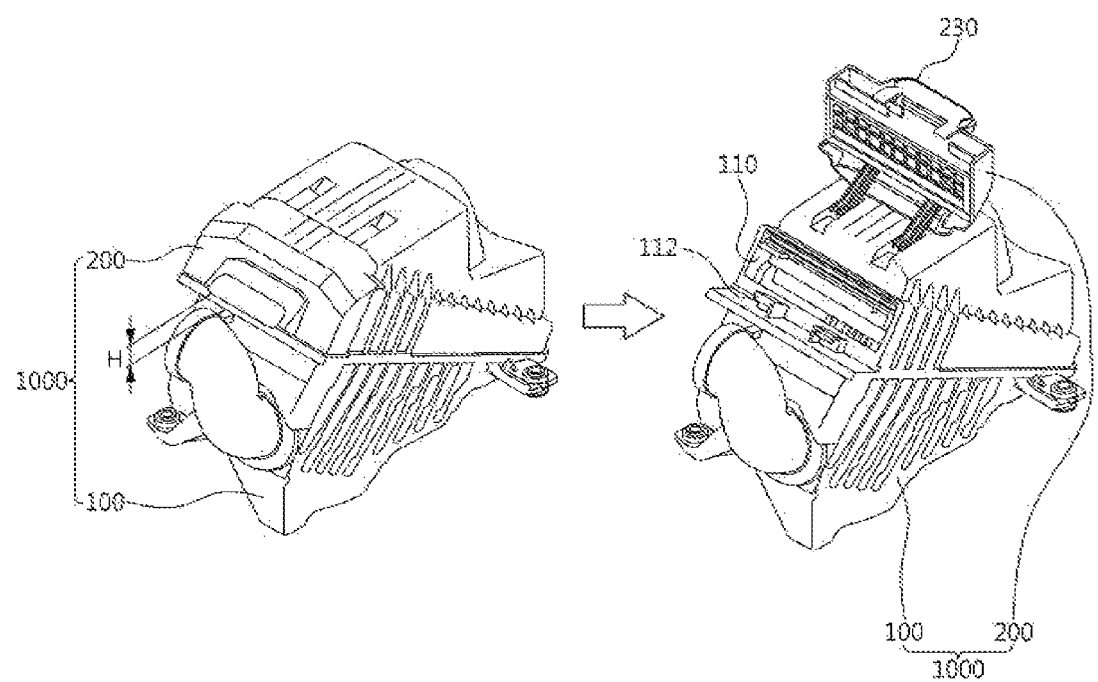
FIG. 1 is a diagram illustrating an operation of opening a drawer-type air cleaner for vehicles including a filter cover structure in accordance with an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention will be described below in more detail with reference to the accompanying drawings so as to be easily realized by those skilled in the art. The present invention may, however, be embodied in different forms and should not be construed as limited to the exemplary embodiments set forth herein. Furthermore, contents represented in the accompanying drawings have been diagrammed in order to easily describe the exemplary embodiments of the present invention, and may be different from forms that are actually implemented.

It will be understood that when an element is referred to as being "coupled" or "connected" to another element, it may be directly coupled or connected to the other element or intervening elements may be present therebetween. Here, the term "coupling" may include direct coupling and indirect coupling between two components, and may mean all types of physical coupling such as adhesion, attachment, fastening, bonding, and joining. Terms such as "first" and "second" may be used to describe various components, but they should not limit the various components. Those terms are only used for the purpose of differentiating a component from other components.

FIG. 1 is a diagram illustrating an operation of opening a drawer-type air cleaner for vehicles including a drawer-type air cleaner filter cover structure in accordance with an exemplary embodiment of the present disclosure. Referring to FIG. 1, the filter cover structure 1000 of the drawer-type air cleaner may include a main body 100 in which an air filter reception part 110 is formed, and a filter cover 200 disposed on an upper portion of the main body 100 and provided to open or close the air filter reception part 110.

The filter cover structure 1000 may have a lever 230 mounted to the filter cover 200 and rotated around a rotating shaft (refer to 234 of FIG. 3) and locked to or released from a filter cover fastening part 112 of the main body 100 to close or open the filter cover 200. In other words, under normal conditions, the filter cover 200 may cover the air filter reception part 110 of the main body 100. When the filter cover 200 opens upward, the air filter reception part 110 may be exposed, thus allowing an air filter to be replaced with a new one.

Figure 2:
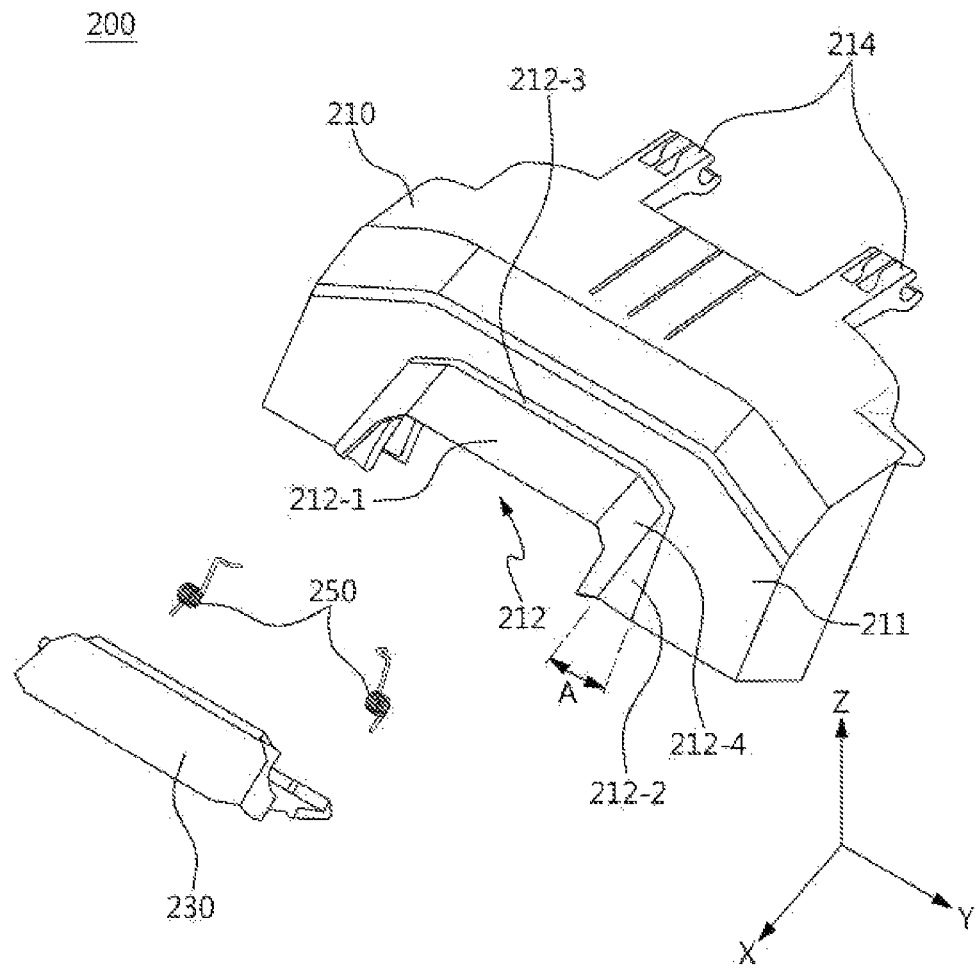
FIG. 2 is a perspective view illustrating the filter cover structure of the drawer-type air cleaner for vehicles in accordance with an exemplary embodiment of the present invention.

FIG. 2 is a perspective view illustrating the filter cover structure of the drawer-type air cleaner for vehicles in accordance with the exemplary embodiment of the present invention. Referring to FIG. 2 along with FIG. 1, the filter cover 200 may include a cover body 210, a lever 230 coupled to a front portion of the cover body 210 based on a direction in which the lever 230 is coupled to the cover body 210, and an elastic member 250 configured to provide elasticity to the lever 230. In other words, the direction in which the lever 230 is coupled to the cover body 210 corresponds to the X-axis direction. The Y axis corresponds to a transverse direction of the cover body 210. The Z axis corresponds to a direction perpendicular to the X axis and the Y axis. The X axis, the Y axis, and the Z axis form an XYZ coordinate system.

Particularly, a recessed part 212 may be formed in the front portion of the cover body 210 to couple the lever 230 to the recessed part 212. The recessed part 212 may have a shape that protrudes upward in an inclined direction from a recessed-part forming surface 211 of the cover body 210. The recessed part 212 may include a top surface 212-1 disposed at an upper position, side surfaces 212-2 that extend in opposite directions from the top surface 212-1, and a rear surface 212-3 that extends rearward from the top surface 212-1.

In an exemplary embodiment, each of the top surface 212-1 and the side surfaces 212-2 may be formed in a polygonal shape. In the drawing, an example is illustrated in which an inclined surface 212-4 is provided between the top surface 212-1 and each side surface 212-2, but the present invention is not limited to this. Furthermore, each side surface 212-2 has a triangular shape.

An angle between the side surface 212-2 and the lever 230, i.e., an angle A between the recessed-part forming surface 211 of the cover body 210 and an upper edge of the side surface 212-2, may be within an acute angular range. If the angle A is beyond the acute angular range, the opening operation may not be easily performed, or the space required for installation of the filter cover 200 may increase unnecessarily. A plurality of cover body mounting parts 214 which are rotatably coupled to the main body 100 may be provided on a rear portion of the cover body 210 at positions spaced apart from each other.

Figure 3:
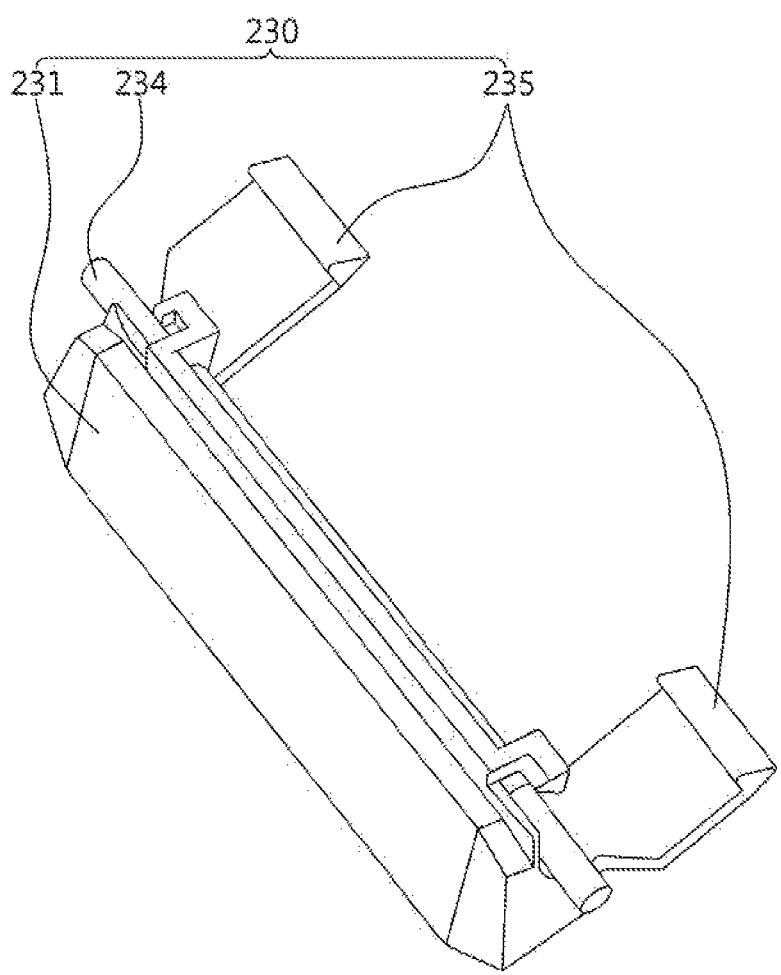
FIG. 3 is a perspective view illustrating a lever of the filter cover structure of the drawer-type air cleaner for vehicles in accordance with an exemplary embodiment of the present invention.
Figure 4:
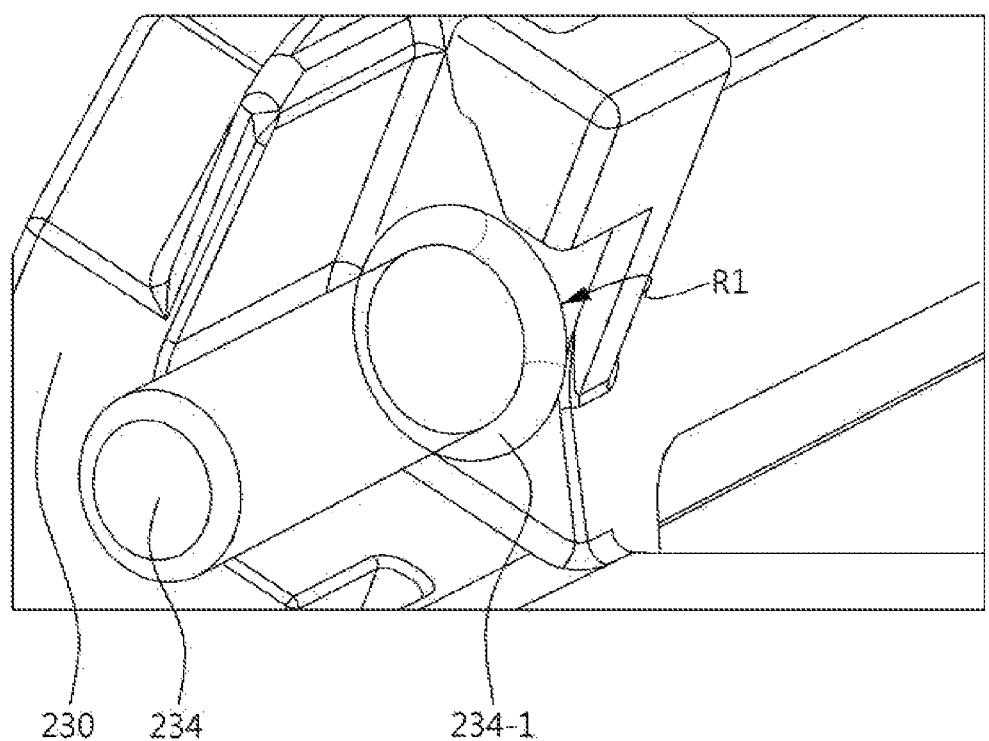
FIG. 4 is a partial enlarged schematic view of the level of the filter cover structure of the drawer-type air cleaner for vehicles in accordance with an exemplary embodiment of the present invention.

FIG. 3 is a perspective view illustrating the lever of the filter cover structure of the drawer-type air cleaner for vehicles in accordance with an exemplary embodiment of the present invention. FIG. 4 is a partial enlarged schematic view of the level of the filter cover structure of the drawer-type air cleaner for vehicles in accordance with an exemplary embodiment of the present invention. Referring to FIGS. 3 and 4, the lever 230 may include a handle 231, the rotating shaft 234 configured to rotate when force is applied to the handle 231, and a locking part 235 that extends toward the cover body 210. A support part 234-1 of the rotating shaft 234 may be rounded or chamfered. For example, the support part 234-1 may be rounded with a radius of R1, as shown in the drawing. The stiffness is secured by the foregoing rounded structure, so that there is no need of a separate component for securing the stiffness.

Figure 5:
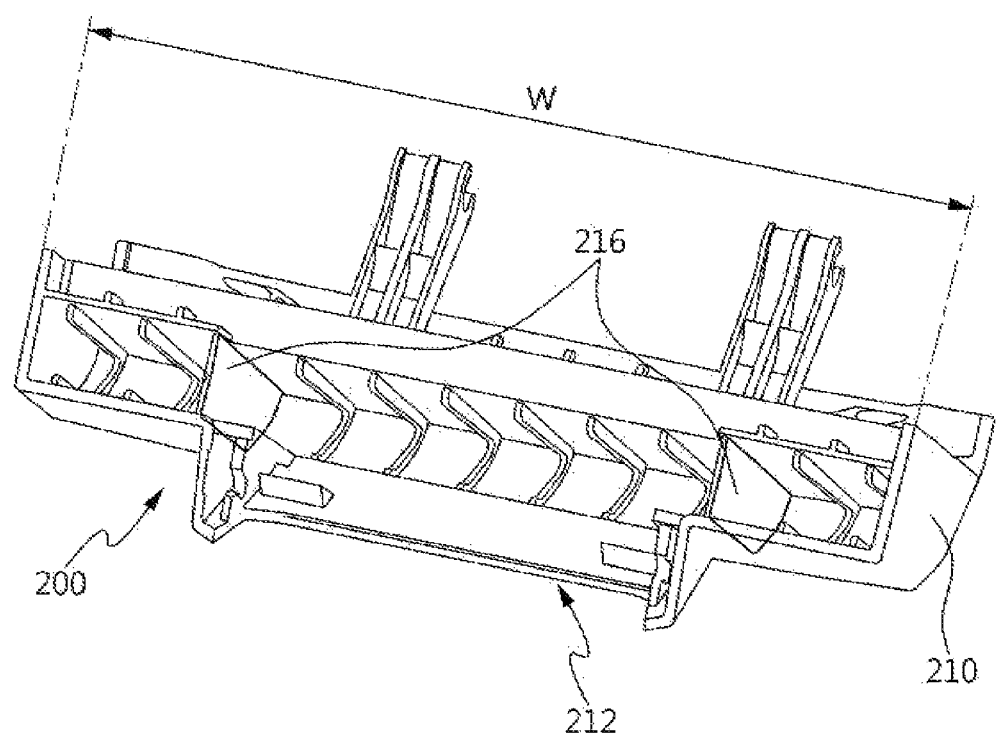
FIG. 5 is a schematic diagram illustrating an inner surface of a filter cover of the filter cover structure of the drawer-type air cleaner for vehicles in accordance with an exemplary embodiment of the present invention.
Figure 6:
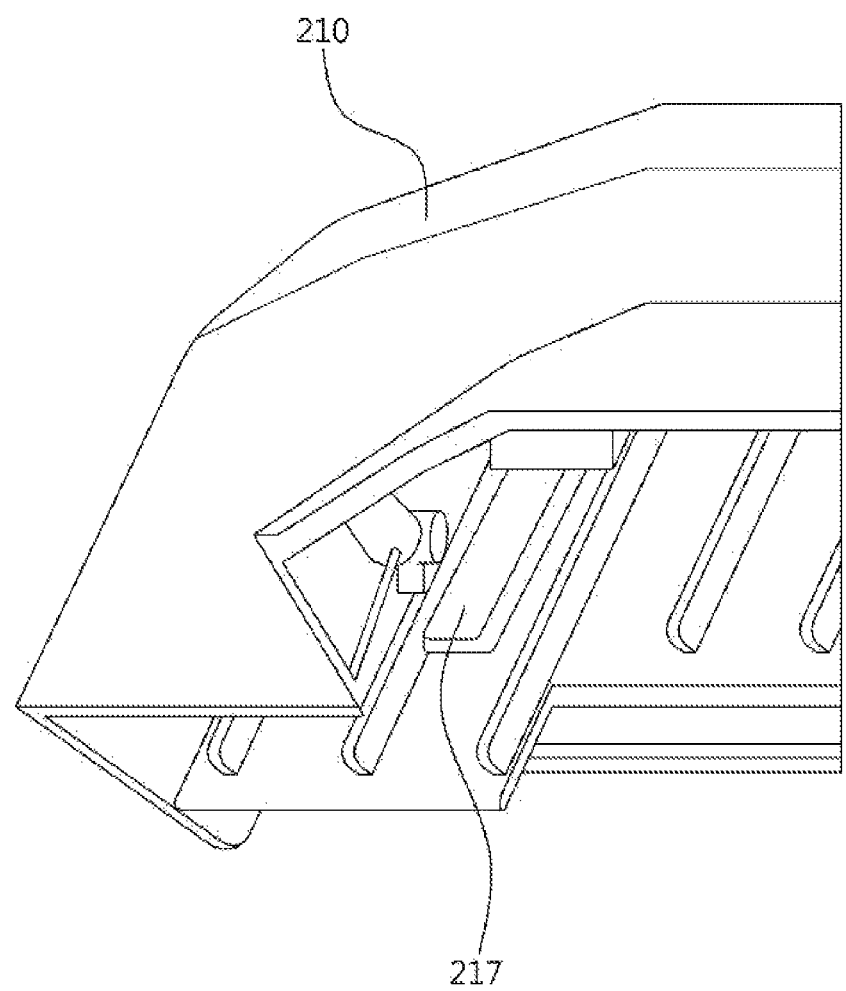
FIG. 6 is a schematic diagram illustrating an internal structure of the filter cover of the filter cover structure of the drawer-type air cleaner for vehicles in accordance with an exemplary embodiment of the present invention.
Figure 7:
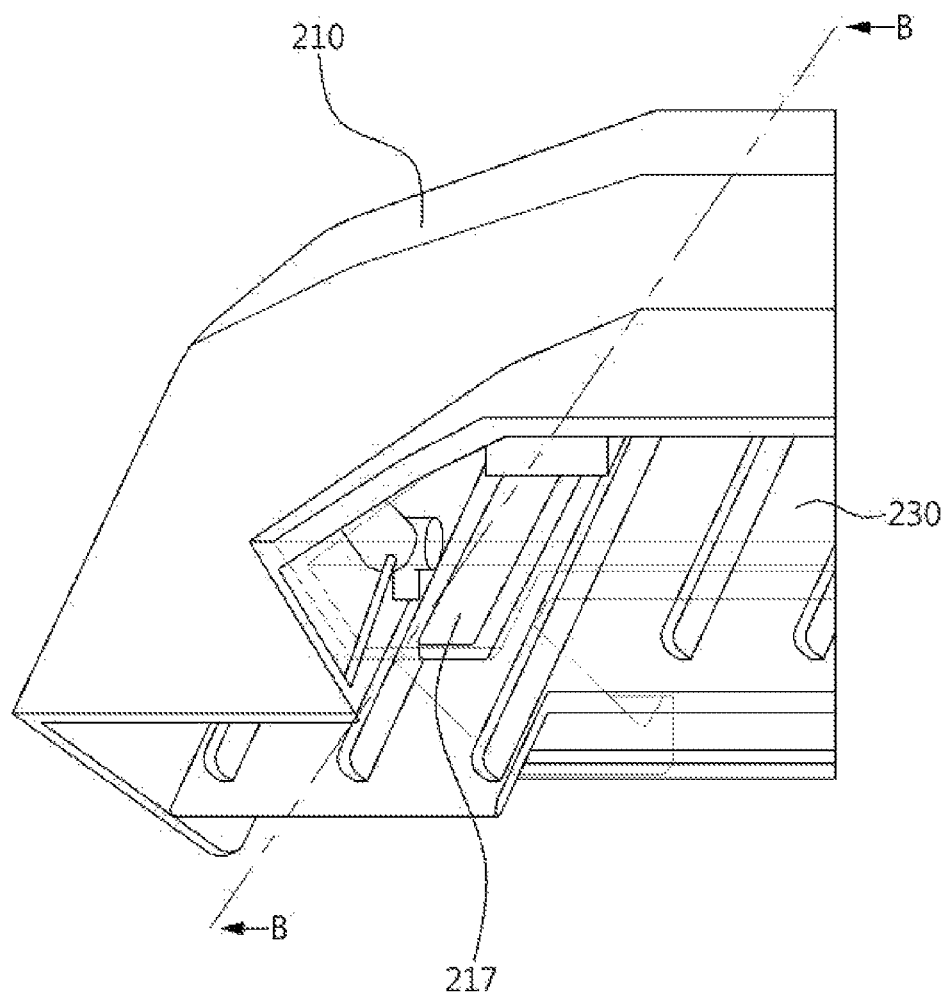
FIG. 7 is a schematic diagram illustrating the filter cover structure of the drawer-type air cleaner for vehicles in accordance with an exemplary embodiment of the present invention.

Furthermore, an end of the locking part 235 may have a hook shape and be locked to the filter cover fastening part (refer to 112 of FIG. 8) formed in the main body (refer to 100 of FIG. 1). FIG. 5 is a schematic diagram illustrating an inner surface of the filter cover of the filter cover structure of the drawer-type air cleaner for vehicles in accordance with an exemplary embodiment of the present invention. FIG. 6 is a schematic diagram illustrating an internal structure of the filter cover of the filter cover structure of the drawer-type air cleaner for vehicles in accordance with an exemplary embodiment of the present invention. FIG. 7 is a schematic diagram illustrating the filter cover structure of the drawer-type air cleaner for vehicles in accordance with an exemplary embodiment of the present invention.

Referring to FIGS. 5 to 7 along with FIG. 2, the filter cover 200 may include a cover body 210, a lever 230 coupled to the front portion of the cover body 210 based on a direction in which the lever 230 is coupled to the cover body 210, and an elastic member 250 configured to provide elasticity to the lever 230, wherein a plurality of partition plates 216 for preventing deformation may be formed in the cover body 210. In particular, the partition plates 216 may be disposed on a rear portion of the recessed part 212 to be coupled with the lever 230 and may be formed within a width W between opposite side surfaces of the cover body 210 at positions spaced apart from each other. Furthermore, a lever position adjustment part 217 may be formed in the cover body 210 to adjust the position of the lever 230.

Figure 8:
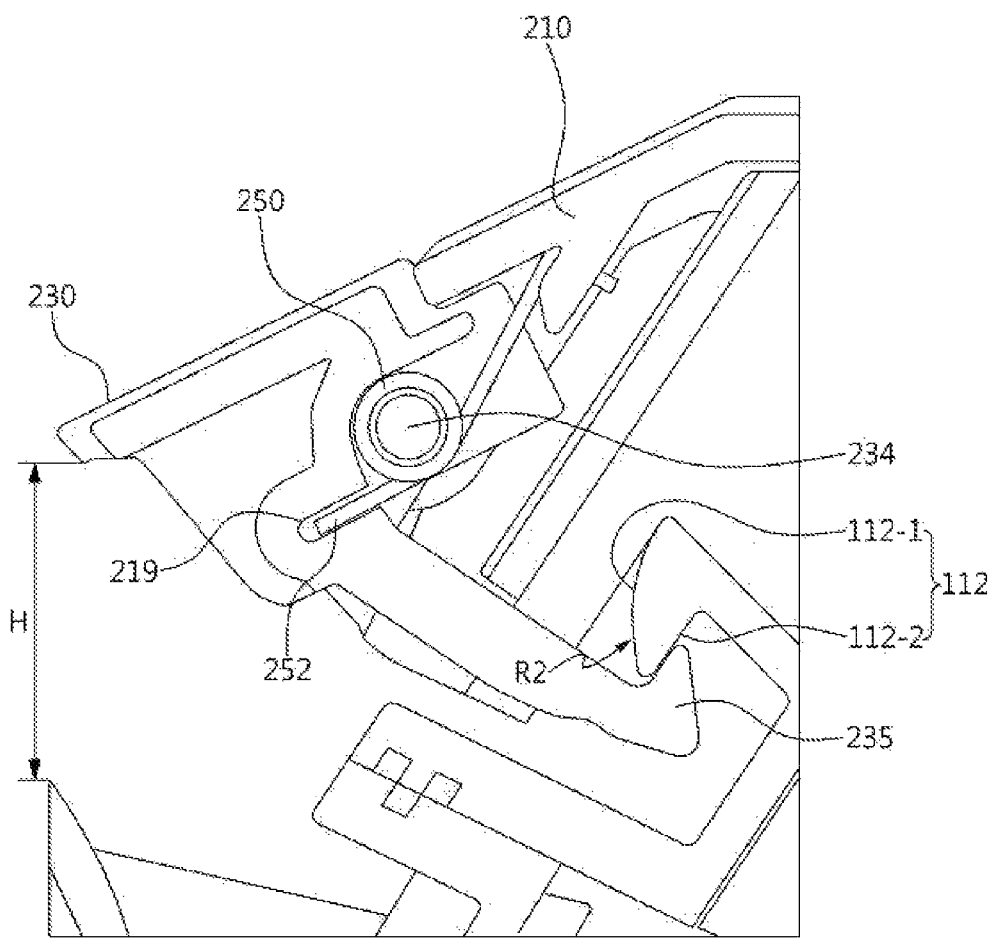
FIG. 8 is a partial schematic sectional view taken along line B-B of FIG. 7 accordance with an exemplary embodiment of the present invention.
Figure 9:
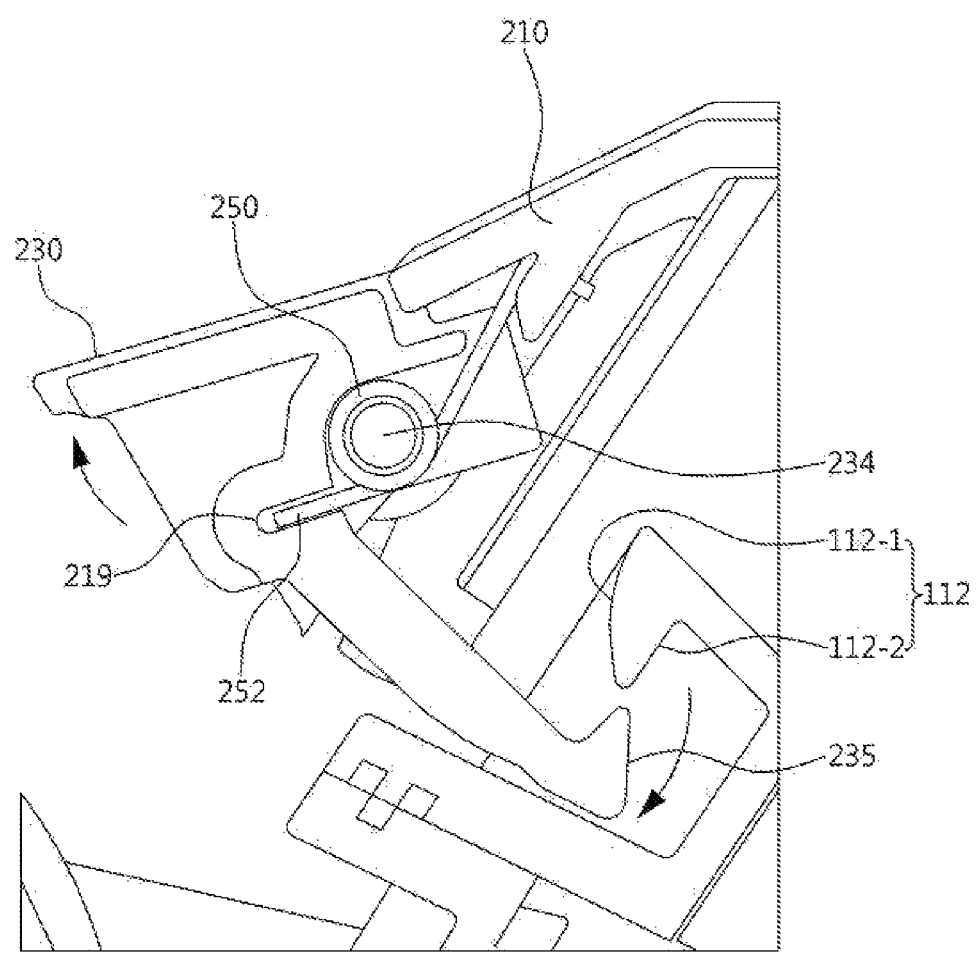
FIG. 9 is a schematic diagram illustrating an opening operation of the filter cover structure of the drawer-type air cleaner for vehicles in accordance with an exemplary embodiment of the present invention.
Figure 10:
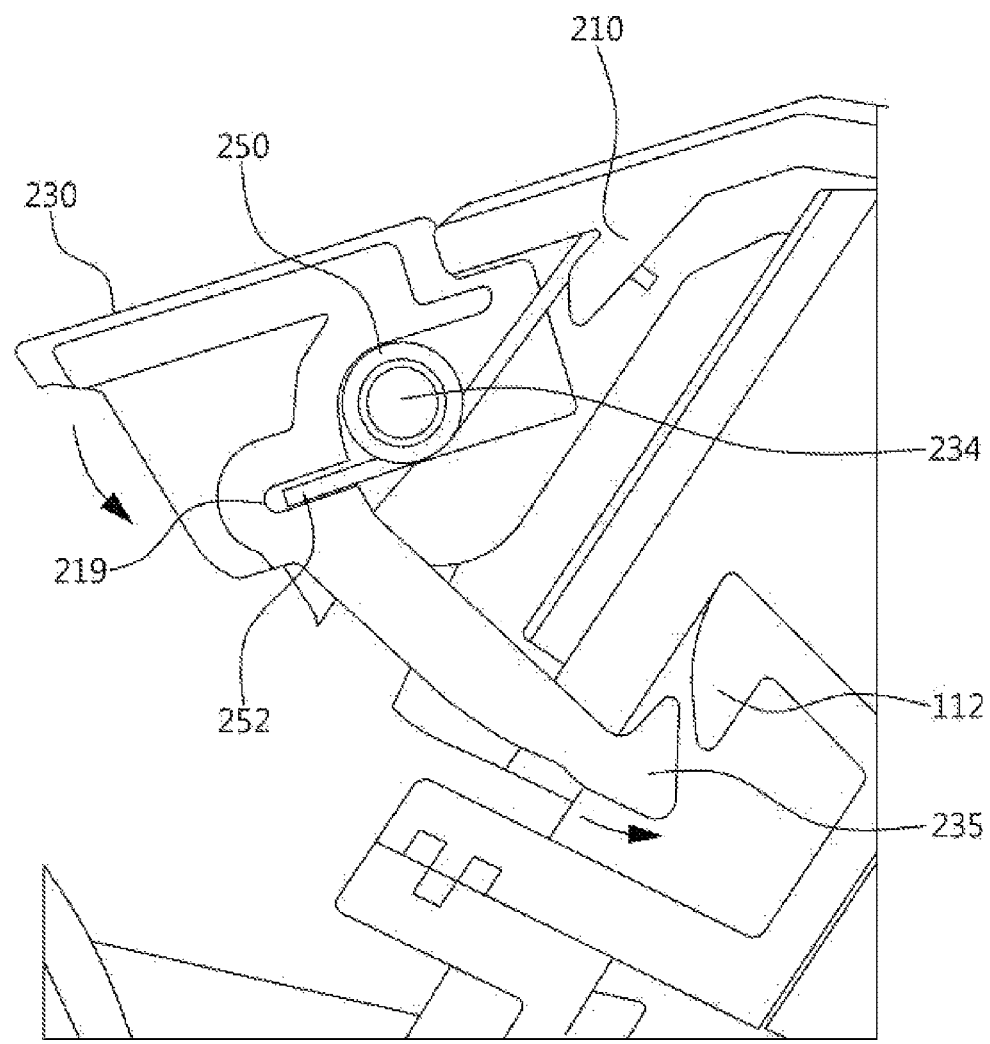
FIG. 10 is a schematic diagram illustrating a closing operation of the filter cover structure of the drawer-type air cleaner for vehicles in accordance with an exemplary embodiment of the present invention.

FIG. 8 is a partial schematic sectional view taken along line B-B of FIG. 7. FIG. 9 is a schematic diagram illustrating an opening operation of the filter cover structure of the drawer-type air cleaner for vehicles in accordance with an exemplary embodiment of the present invention. FIG. 10 is a schematic diagram illustrating a closing operation of the filter cover structure of the drawer-type air cleaner for vehicles in accordance with an exemplary embodiment of the present invention.

Referring to FIGS. 8 to 10 along with FIGS. 1 and 2, the filter cover 200 may include a cover body 210, a lever 230 coupled to the front portion of the cover body 210 based on a direction in which the lever 230 is coupled to the cover body 210, and an elastic member 250 configured to provide elasticity to the lever 230. A recessed part 212 to be coupled with the lever 230 may be formed in the front portion of the cover body 210, and the elastic member 250 may be fitted over each of the opposite ends of the rotating shaft 234 of the lever 230.

According to the present invention, one end 252 of the elastic member 250 may be inserted into an elastic member fixing depression 219 to enable the elastic member 250 to apply elastic force to the lever 230. The locking part 235 may be locked and fastened to the filter cover fastening part 112 formed in the main body 100. When force is applied to the handle 231 of the lever 230 upward to release the locking part 235 from the filter cover fastening part 112 formed in the main body 100, the locking part 235 may be moved away from the filter cover fastening part 112 to release the locked state of the locking part 235.

Further, during a process of locking the locking part 235 to the filter cover fastening part 112, the locking part 235 makes contact with an outer surface 112-1 of the filter cover fastening part 112 and then may be hooked to the filter cover fastening part 112. The outer surface 112-1 of the filter cover fastening part 112 may have a rounded structure to have a radius of R2.

Figure 11:
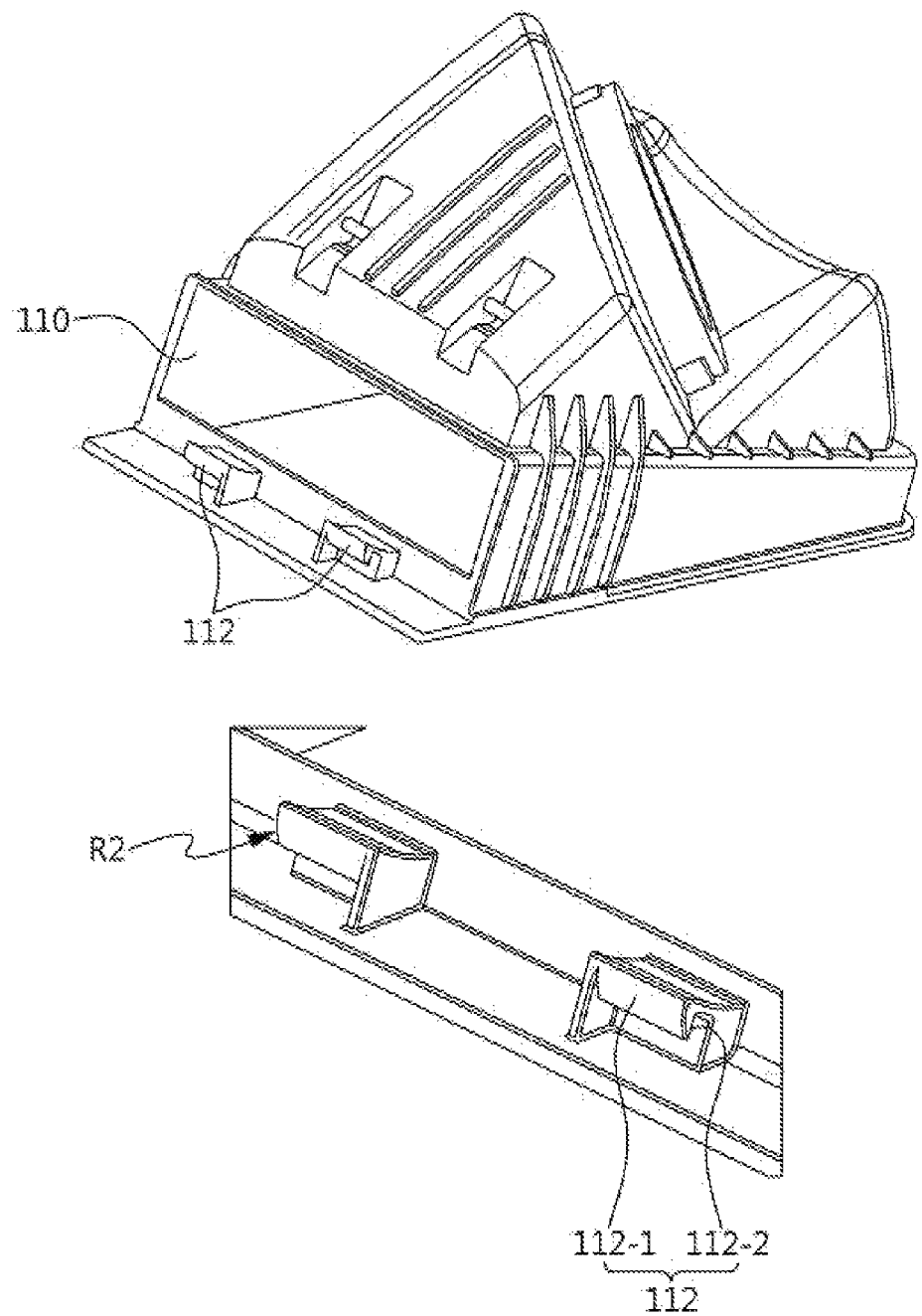
FIG. 11 illustrates a perspective view and a partial enlarged schematic view of a main body of the filter cover structure of the drawer-type air cleaner for vehicles in accordance with an exemplary embodiment of the present invention.

FIG. 11 illustrates a perspective view and a partial enlarged schematic view of the main body of the filter cover structure of the drawer-type air cleaner for vehicles in accordance with an exemplary embodiment of the present invention. Referring to FIG. 11 along with FIGS. 1 to 3, a filter cover structure 1000 of a drawer-type air cleaner may include a main body 100 in which an air filter reception part 110 is formed, and a filter cover 200 configured to open or close the air filter reception part 110 disposed in an upper portion of the main body 100. A filter cover fastening part 112 may be formed in the main body 100 to lock the locking part 235 of the lever 230 to the filter cover fastening part 112. An outer surface 112-1 of the filter cover fastening part 112 may be rounded, and an inner surface 112-2 thereof may have a planar surface.

The operation of a filter cover structure 1000 of a drawer-type air cleaner in accordance with an exemplary embodiment of the present invention will be described with reference to the accompanying drawings. The filter cover structure 1000 may include a main body 100 in which an air filter reception part 110 is formed, and a filter cover 200 configured to open or close the air filter reception part 110 disposed in an upper portion of the main body 100. The filter cover 200 may include a cover body 210, a lever 230 coupled to a front portion of the cover body 210 based on a direction in which the lever 230 is coupled to the cover body 210, and an elastic member 250 configured to provide elasticity to the lever 230.

When force is applied to the lever 230 upward, the lever 230 may be configured to rotate around the rotating shaft 234 to move the locking part 235 extending toward the cover body 210 backward from the filter cover fastening part 112 to thus release the locked state and open the filter cover 200 upward. When force is applied to the lever 230 downward to close the filter cover 200 after the air filter has been replaced with a new one while the filter cover 200 is in the open state, the locking part 235 comes into contact with the outer surface 112-1 of the filter cover fastening part 112. Particularly, since the outer surface 112-1 may be rounded, the locking part 235 may slide and pass over the outer surface 112-1 of the filter cover fastening part 112. Then, the locking part 235 may be locked to the inner surface 112-2 of the filter cover fastening part 112.

Therefore, in a filter cover structure of a drawer-type air cleaner, an air cleaner, an intake system, and a vehicle including them in accordance with the present invention, convenience in replacement of an air cleaner filter may be enhanced, the filter cover may be prevented from being deformed, the aesthetic appearance may be improved, and the position of the lever may be adjusted more accurately to optimize the force required for opening or closing the filter cover may be optimized and thus, the quality of the product may be improved.

It will be understood to those skilled in the art that the present invention may be implemented in different specific forms without changing the technical ideas or essential characteristics. Accordingly, exemplary embodiments disclosed in the present specification have been selected as the most preferable embodiments from among various possible embodiments and have been presented, for easy understanding by those skilled in the art. It is apparent that the technical spirit of the present invention is not necessarily limited or restricted to the above exemplary embodiments, and that various modifications, additions and substitutions are possible, and other equivalent exemplary embodiments are also possible, without departing from the scope and spirit of the invention.

It is intended that the bounds of the present invention are defined by the accompanying claims, and various modifications, additions and substitutions, which can be derived from the meaning, scope and equivalent concepts of the accompanying claims, fall within the bounds of the present invention. The terms and words used in the specification and claims must not be limited to typical or dictionary meanings, but must be regarded as concepts selected by the inventor as concepts which best illustrate the present invention, and must be interpreted as having meanings and concepts adapted to the scope and spirit of the present invention to aid in understanding the technology of the present invention.

Furthermore, the operation of the configurations described in the above detailed descriptions may not always be performed in a time series sequence. It should be noted that even if the sequence of performing the configurations and steps change, this may fall within the bounds of the present invention so long as the gist of the present invention can be satisfied.

What is claimed is:

1. A filter cover structure of a drawer-type air cleaner, comprising:
    a main body in which an air filter reception part is formed; and
    a filter cover disposed on an upper portion of the main body and provided to open or close the air filter reception part,
    wherein the filter cover includes a cover body and a lever coupled to the cover body and elastically mounted at a rotating shaft provided in the cover body,
    wherein the lever includes a handle, an elastic member configured to apply elastic force to the lever, and a locking part that extends toward the cover body of the filter cover, and
    wherein the locking part includes a first hook portion configured to be locked to or released from a second hook portion formed at a filter cover fastening part of the air filter reception part when the lever rotates around the rotating shaft by applying force to the handle.

2. The filter cover structure according to claim 1, wherein a support part of the rotating shaft is rounded.

3. The filter cover structure according to claim 1, wherein the first hook portion is formed at an end of the locking part.

4. The filter cover structure according to claim 1, wherein the lever has, in an inner surface thereof, an elastic member fixing depression to which the elastic member is fixed.

5. The filter cover structure according to claim 1, wherein the filter cover includes, in a front portion thereof, a recessed part coupled with the lever.

6. The filter cover structure according to claim 5, wherein the recessed part includes:
    a top surface;
    side surfaces that extend from the top surface in opposite directions; and
    a rear surface that extends rearward from the top surface.

7. The filter cover structure according to claim 6, wherein each of the side surfaces has a triangular shape.

8. The filter cover structure according to claim 1, wherein a partition plate for preventing deformation is provided in the filter cover.

9. The filter cover structure according to claim 8, wherein the partition plate is disposed on a rear portion of the recessed part coupled with the lever.

10. The filter cover structure according to claim 1, wherein a lever position adjustment part for adjusting a position of the lever is provided in the filter cover.

11. The filter cover structure according to claim 1, wherein an elastic member fixing part is provided in the filter cover to fix the elastic member to the elastic member fixing part.

12. The filter cover structure according to claim 1, wherein a cover body mounting part is provided on a rear portion of the filter cover and rotatably coupled to the main body.

13. The filter cover structure according to claim 1, wherein the lever is coupled to a front portion of the cover body based on a direction in which the lever is coupled to the cover body.

14. The filter cover structure according to claim 1, wherein the filter cover fastening part is provided in the main body to lock the locking part of the lever to the filter cover fastening part.

15. The filter cover structure according to claim 1, wherein an outer surface of the filter cover fastening part is rounded.

16. A drawer-type air cleaner for vehicles including the filter cover structure according to claim 1.

17. An intake system configured to supply fresh air passing through an air cleaner including the filter cover structure according to claim 1 into an engine.

18. The intake system according to claim 17, wherein the intake system is mounted to an engine room provided with an engine.

\* \* \* \* \*